United States Patent [19] [11] 3,708,271
Loewenstein et al. [45] Jan. 2, 1973

[54] APPARATUS FOR PRODUCING GLASS FIBERS

[75] Inventors: Klaus L. Loewenstein, Earnold J. Eisenberg, both of East Setauket, N.Y. 11733; Saul Warshaw, New York, N.Y. 10003

[73] Assignee: Oliver Glass Fiber Corporation, Farmingdale, N.Y.

[22] Filed: Dec. 7, 1970

[21] Appl. No.: 95,757

[52] U.S. Cl. .......................................... 65/12
[51] Int. Cl. ........................................ C03b 37/02
[58] Field of Search ................. 65/1, 2, 11 W, 12

[56] References Cited

UNITED STATES PATENTS

| 3,468,644 | 9/1969 | Leaman | 65/1 X |
| 3,522,025 | 7/1970 | Smith | 65/12 |

Primary Examiner—Robert L. Lindsay, Jr.
Attorney—Curtis, Morris & Safford

[57] ABSTRACT

An improved fin cooler structure for use in apparatus for the production of continuous glass filaments attenuated from streams of glass flowing through orifices in a stream feeder comprising elongated members or fins of a non-ferrous metal disposed in heat-transferring relation with the streams of glass fibers thereby to absorb and convey away heat from cones of glass formed by the glass flowing through the orifices to rapidly cool the glass of the streams as well as to stabilize the environment by isolating the cones of glass from atmospheric air currents. The fin cooler structure is formed of a single sheet of material by cutting the fin members in a portion of a flat sheet of material and rolling the uncut portion of the sheet to form a tubular member through which heat conducting fluid, such as water, may be passed to increase the heat absorbing efficiency of the fin cooler structure.

5 Claims, 6 Drawing Figures

PATENTED JAN 2 1973                    3,708,271
SHEET 1 OF 2
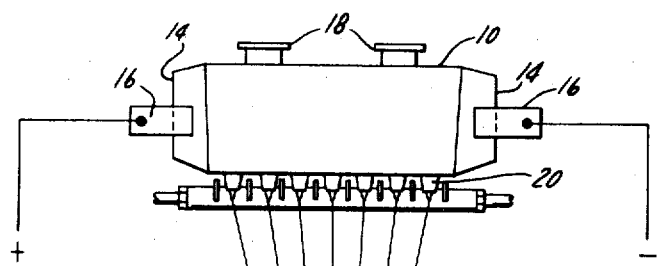
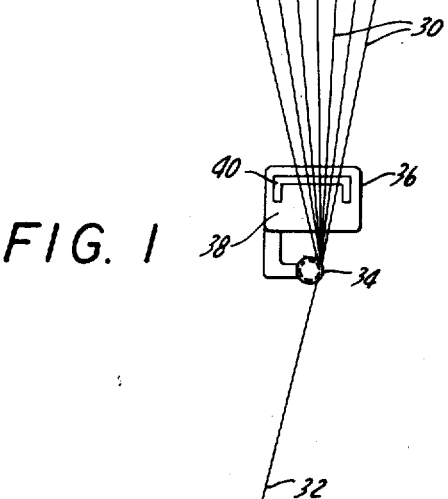
FIG. 1
FIG. 2
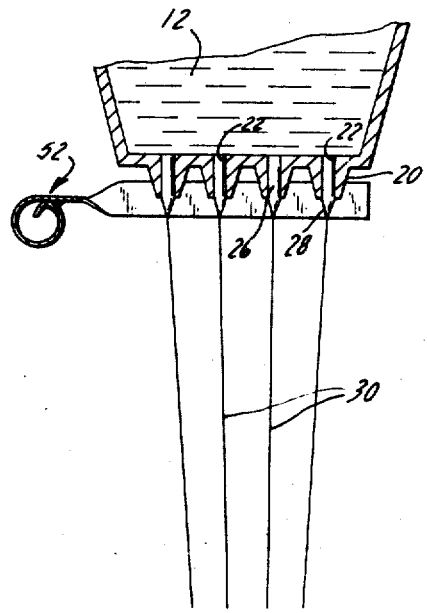
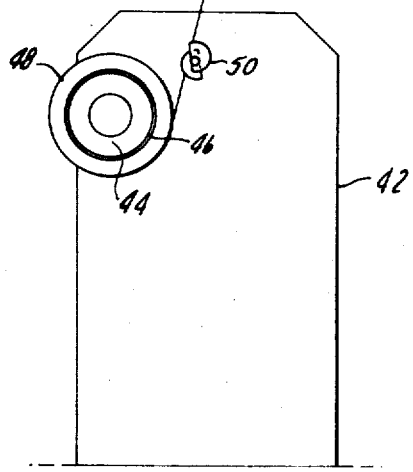
INVENTORS
KLAUS L. LOWENSTEIN
ARNOLD J. EISENBERG
SAUL WARSHAW
BY
Curtis, Morris & Safford
ATTORNEYS

APPARATUS FOR PRODUCING GLASS FIBERS

This invention relates to apparatus for the production of glass fibers and more particularly to an improved finned cooler structure used to absorb and convey away heat from cones of glass to rapidly cool the glass as it forms streams depending from a bushing or nozzle.

In the production of glass fibers, for example by the method and apparatus illustrated in U.S. Pat. No. 2,908,036 to Russell and U.S. Pat. No. 3,468,644 to Leaman, streams of glass are allowed to flow from orified projections depending from a stream feeder containing a supply of heat-softened glass and are attenuated to comparatively fine continuous filaments or fibers. The glass in the stream feeder or bushing is heated and the temperature controlled to maintain the glass adjacent the orifices of comparatively low viscosity to promote the flow of streams of glass of substantially uniform size for attenuation to filaments of substantially uniform size. These streams of glass are allowed to flow between the extending fins of a heat sink or cooler structure which absorbs and conveys away heat from the glass to rapidly cool the glass of the streams as well as stabilizing the environment by isolating the cones of glass from atmospheric air currents.

The finned heat sinks as shown in the above-mentioned Russell and Leaman patents are constructed by soldering the finned members to a hollow, rectangularly shaped header and water or other coolant fluid is fed through the header in order to draw off the heat transferred to the extending fin members.

While the finned heat sink members as shown in the Russell and Leaman patents have been found to be generally effective for use in apparatus to produce glass fibers, these devices have a number of inherent deficiencies. As an example of some of the shortcomings of these prior art devices, these fin cooling members are constructed by taking a hollow rectangularly shaped bar member, providing receiving notches in one side of the bar and soldering the individual fin members to the bar in the receiving notches. This procedure inherently involves a considerable expense in the manufacture of the heat sink member. Additionally, when in use, liquid glass material occasionally touches the fins which changes the heat transfer characteristics of the fins tending to degrade the soldered joint of the fins to the header segment. Also, the soldered joints provides no flexibility with respect to changing the position of the radiating fin cooler and, as the bushing in which the molten glass is stored ages, changes result in the bushing temperature so that the temperature pattern does not remain symmetrical resulting in selective variations in the heat transferability of the fin cooler which affects the quality of the glass fibers produced. It is, therefore, necessary to periodically replace the fin cooler member and because the fin cooler members are expensive to manufacture, the necessary replacement of fin cooler members is inordinately expensive.

Accordingly, it is an object of the present invention to provide a fin cooler member of the character described for use in an apparatus for the production of glass fibers which has superior heat conducting properties, and which has a longer more effective usage time and which is simpler and less costly to manufacture to eliminate high replacement costs for worn fin coolers.

It is another object of the present invention to provide a fin cooler member for use in an apparatus for the production of glass fibers which has a superior heat conduction ability by reason of the elimination of soldered joints and by constructing a fin cooler which by its configuration has a superior heat conduction path to more effectively convey away heat from cones of glass adjacent the extending fin portions of the cooler member.

These and other objects of the present invention will be more readily understood after consideration of the following specification and drawings wherein:

FIG. 1 is a diagrammatic elevational view of an apparatus for the production of glass fibers;

FIG. 2 is an enlarged fragmentary section view of a portion of the apparatus for the production of glass fibers showing the molten glass bushing and the fin cooler apparatus;

Figure 3:
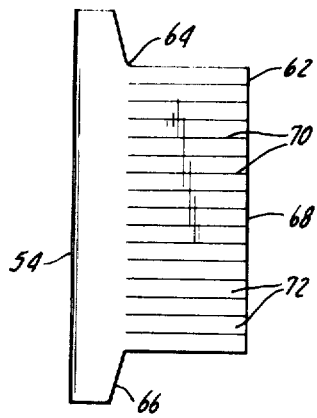
FIG. 3 is a plan view of the fin cooler apparatus of the present invention in a preliminary stage of construction.

In accordance with the present invention, an improved fin cooler is provided for use in conjunction with an apparatus for the production of glass fibers wherein the fin cooler is constructed from a single sheet of heat conducting material, for example copper, in a manner so as to eliminate the necessity for soldering the radiating fin coolers to the header segment. The fin cooler of the present invention is prepared by cutting laterally part way through a flat sheet of stock material, twisting the laterally cut portions to form the fins and rolling the uncut portion into a cylindrical shape to from form the header segment of the cooler. The completed structure is then plated with a corrosive resistant material and placed in operation. In this manner, an economical, low cost fin cooler is provided which has superior heat transfer characteristics and which is more adaptable in use because the position of the radiating fins can be changed relative to the position of the glass nozzles because of the absence of a solder joint between the fins and the header segment.

With reference to the drawings and particularly FIG. 1 thereof, there is shown a stream feeder or bushing 10 provided with a chamber 12 (FIG. 2) to hold a supply of liquid heat-softened glass. The stream feeder 10 is adapted to receive molten glass from a glass making furnace, or to reduce glass material to a molten condition, and is therefore preferably provided with terminal lugs 14 adapted to be connected with current conductors 16 to a source of electrical energy so that current is flowed through the feeder to maintain glass therein in a heat-softened or flowable condition. In practice, glass in the form of marbles is deposited into the chamber 12 through cylindrical receptacles 18 in the upper portion of the stream feeder 10 and is heated by the electric current to a heat-softened or flowable condition.

The base of the stream feeder 10 is provided with a plurality of depending projections 20 with each projection including a glass flow path 22 therein to allow glass to flow out of chamber 12. Each of the projections 20 is provided with a cylindrical orifice or outlet 26 for the glass so that the glass stream at the region of its delivery is in the form of a cone 28. Since the glass, as it exits from the orifice 26, is in a molten state and quite hot, heat must be transferred from or conveyed away from the cones of glass 28 to increase the viscosity of the glass for successful attenuation.

The glass of the cones 28 is attenuated to continuous filaments 30 which are converged into a single strand 32 by a gathering member or shoe 34. Prior to being gathered into a single strand 32, the individual filaments 30 are sized or coated in an applicator member 36 disposed above the gathering shoe 34. Applicator member 36 includes a reservoir chamber 38 adapted to contain a sizing or coating material which is supplied to the filaments 30 by applicator member 40. Applicator member 40 may be a movable endless belt partially immersed in the sizing or coating material in reservoir 38 to transfer a film of the sizing or coating onto the filaments 30 by wiping engagement.

A winding machine 42 of conventional construction is provided with a rotatable mandrel 44 having a thin walled forming tube 46 telescoped thereon so that the strand 32 is wound upon the rotating tube 46 to form a strand package 48 of wound glass fiber. The winding of the strand 32 upon the packaging tube 46 attenuates the glass streams to filaments and a reciprocable oscillator traverse 50 is utilized for crossing the individual convolutions of strand 32 as the strand is wound onto the package 48.

Figure 5:
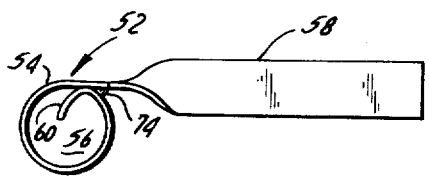
FIG. 5 is an enlarged end view of the fin cooler of the present invention.
Figure 6:
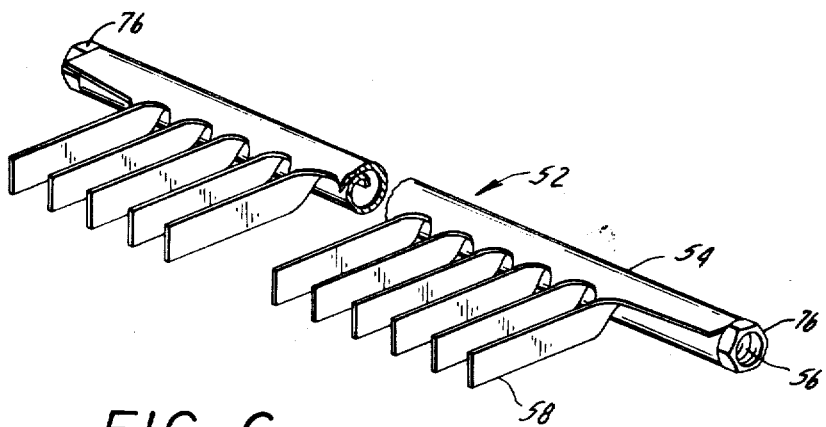
FIG. 6 is a perspective view, partly broken away, of the fin cooler of the present invention.

The heat shield or fin cooler member 52 for conveying away heat from the cones of glass 28 is shown most clearly in FIGS. 2, 5 and 6. The heat shield member 52 includes a longitudinal header or manifold 54 of hollow configuration providing a manifold chamber 56 for fluid passage and the header or manifold 54 is disposed laterally with respect to the feeder structure and parallel thereto. Radiating from the manifold structure 54 at spaced intervals therealong are a plurality of fin heat shield members 58 which are adapted to extend between the projections 20 from the stream feeder 10. These projections are arranged in rows transversely of the stream feeder 10 so that, illustratively, a row of four projections 20 would be interspaced between adjacent fin members 58.

Figure 4:
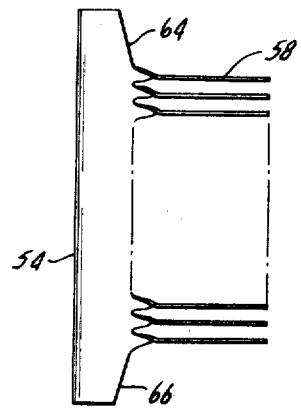
FIG. 4 is a view similar to FIG. 3 showing the fin cooler member of the present invention in a secondary stage of construction.

With reference now to FIGS. 3 and 4 as well, it is seen that the finned cooler member 52 of the present invention is made of a unitary sheet of heat conducting material, such as copper, to achieve superior heat transfer properties as will be explained more fully hereinbelow and also to achieve economy in manufacture and greater versatility to prolong the useful life of the heat shield member in operation as well as to lower the cost of heat shield replacement.

Finned heat shield member 52 is constructed from a flat sheet of a high heat conductive material which initially is rectangularly shaped in plan. In a preliminary step of construction, a longitudinal edge 60 of the flat sheet of heat conductive material is grasped by a forming tool and rolled inwardly upon itself to form the substantially cylindrical header 54 with the longitudinal edge 60 remaining substantially radially disposed inwardly of cylindrical tube 54, as seen in FIG. 5. After header 54 has been rolled, the flat extending portion 62 (see FIG. 3) is cut away at its lateral edge portions as at 64 and 66 to form a central extending portion 68. The extending portion 68 is then cut through with a plurality of parallel spaced cuts 70 to form a plurality of discrete extending finger members 72. Each finger member 72 is then twisted approximately 90° about its longitudinal axis by a forming tool to form the extending fin shield members 58 (see FIG. 4).

Cylindrical header 54 is sealed, for example by soldering or brazing as at 74 so that cylinder 54 is fluid tight and the assembly of the fin cooler member 52 is completed by brazing or soldering a threaded hexagonal nut 76 at each end of tube 54 to facilitate the attachment of fluid inlet and fluid outlet tubes to circulate cooling fluid through header 54. After the assembly has been completed it is plated with a thin layer, of a thickness of from 0.0,005 inch to 0.0,025 inch, of a dissimilar metal such as nickel.

The heat transfer properties of fin shield member 52 are enchanced by its unique unitary construction in that heat from the projections 20 and cones of glass 28 is absorbed by the fin members 58 and conveyed away by conduction through the fin member 58 back to the header member 54. A coolant fluid such as water is continuously flowing through header 54 and thus draws off heat by conduction through the wall of tube 54. However, heat follows a double path in the wall 54 one path being radially through the tube wall from the outside to the inside of the cylindrical tube and the other is a circumferential path following the tube wall to the interior of the header to the trailing edge section 60 which is immersed in the fluid flowing through header 54. Thus, the construction of the fin cooler member 52 increases the capacity of the cooler for conduction away heat absorbed by the fin shields 58.

As pointed out above, as the bushing holding the molten glass ages, the bushing temperature pattern does not remain symmetrical. Therefore, as variations in bushing temperature are detected, the fin members 58 can be shifted laterally with respect to the projections 20 in order to provide a more effective heat transfer relationship between the fin coolers and the glass cones 28. Because the fin cooler 52 is of unitary construction, such shifting of the fin members 58 can be accomplished without danger of breaking the fin shield members off the header 54.

It is thus seen that the present invention provides a unitary fin cooler member for an apparatus for producing glass fibers which more effectively accomplishes the purposes of conveying heat away from the cones of glass adjacent the bushing orifices and which is more economical to manufacture and more readily adaptable for changes in heat transfer properties of the glass bushings during prolonged use.

What is claimed is:

1. In an apparatus for producing glass filaments comprising a feeder having projections extending from an under surface thereof for feeding molten glass, said tips being aligned in rows and each having an orifice provided therein from which a stream of glass is emitted, means for attenuating the streams to fine filaments, said attenuating means acting on said streams in such a way as to impart in general a conical shape to each extending from a base at its respective orifice to an apex from which its respective filament is withdrawn, the improvement comprising a unitary fin cooler member having a generally tubular header adapted to have a cooling fluid passed therethrough and a plurality of substantially parallel radiating fin coolers extending laterally of each header and disposed between said rows of projections of said feeder substantially in the attenuating zone with the streams emitted from the orifices arranged to pass closely adjacent said fin coolers, said fin cooler member being constructed of a unitary sheet of heat-conducting material whereby heat is conducted away from said glass in said attenuating zone along a continuous unbroken path along said extending fin coolers to said header.

2. Apparatus as defined in claim 1 wherein the header portion of said fin cooler member is integral with said radiating fin coolers and is an extension of said radiating fin coolers and is formed by wrapping a flat segment of stock material into a substantially cylindrical form with an end portion of said segment remaining substantially radially inwardly disposed within said formed cylindrical header thereby to form a continuous path for heat conduction extending along said radiating fin coolers and around the circumference of said formed cylindrical header to the interior of said header along said inwardly disposed portion immersed in the cooling fluid and the second path being radially inwardly through the cylindrical wall of said header.

3. Apparatus as defined in claim 2 wherein said fin cooler member is plated with a dissimilar metal to a thickness of 0.0,005 inch to 0.0,025 inch.

4. Apparatus as defined in claim 3 wherein said plating is nickel.

5. Apparatus as defined in claim 2 wherein the open ends of said substantially cylindrical header are provided with a threaded member adapted to be connected to coolant fluid inlet and outlet lines.

* * * * *